May 14, 1940.  H. A. W. WOOD  2,200,905
WEB SPLICING DEVICE
Original Filed Nov. 13, 1934   5 Sheets—Sheet 2

Inventor
Henry A. Wise Wood
By attorneys

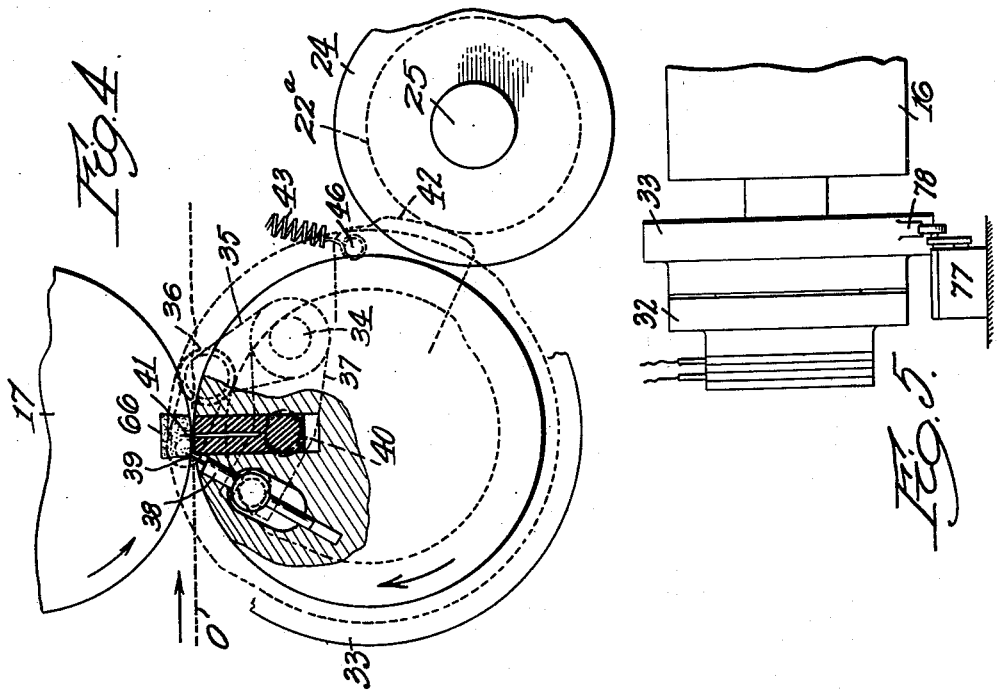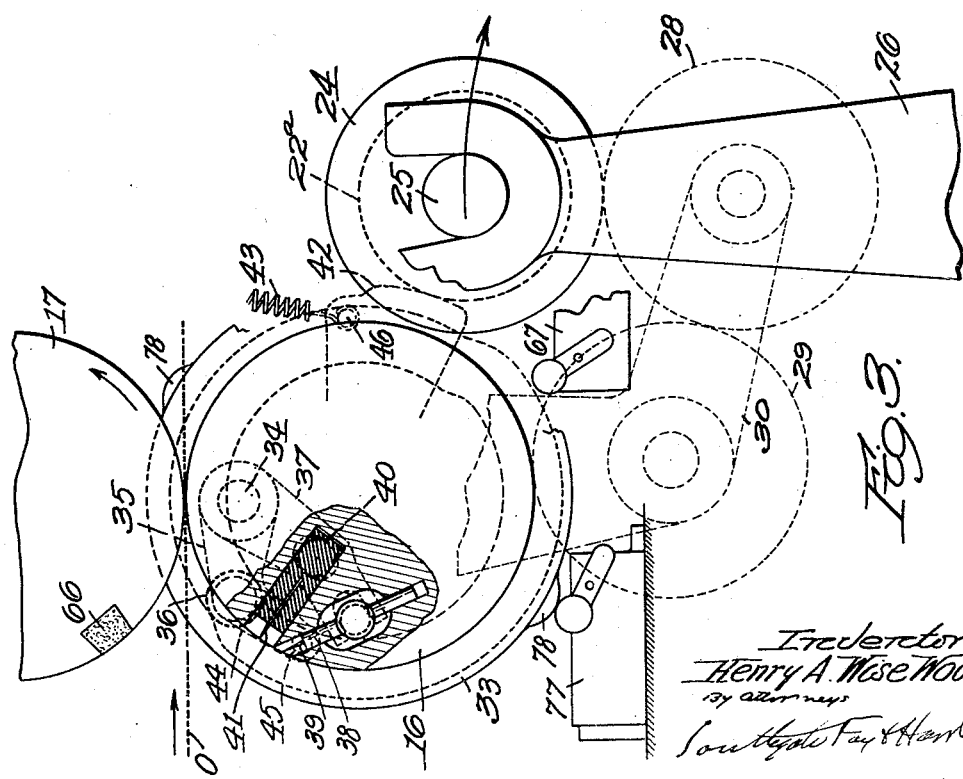

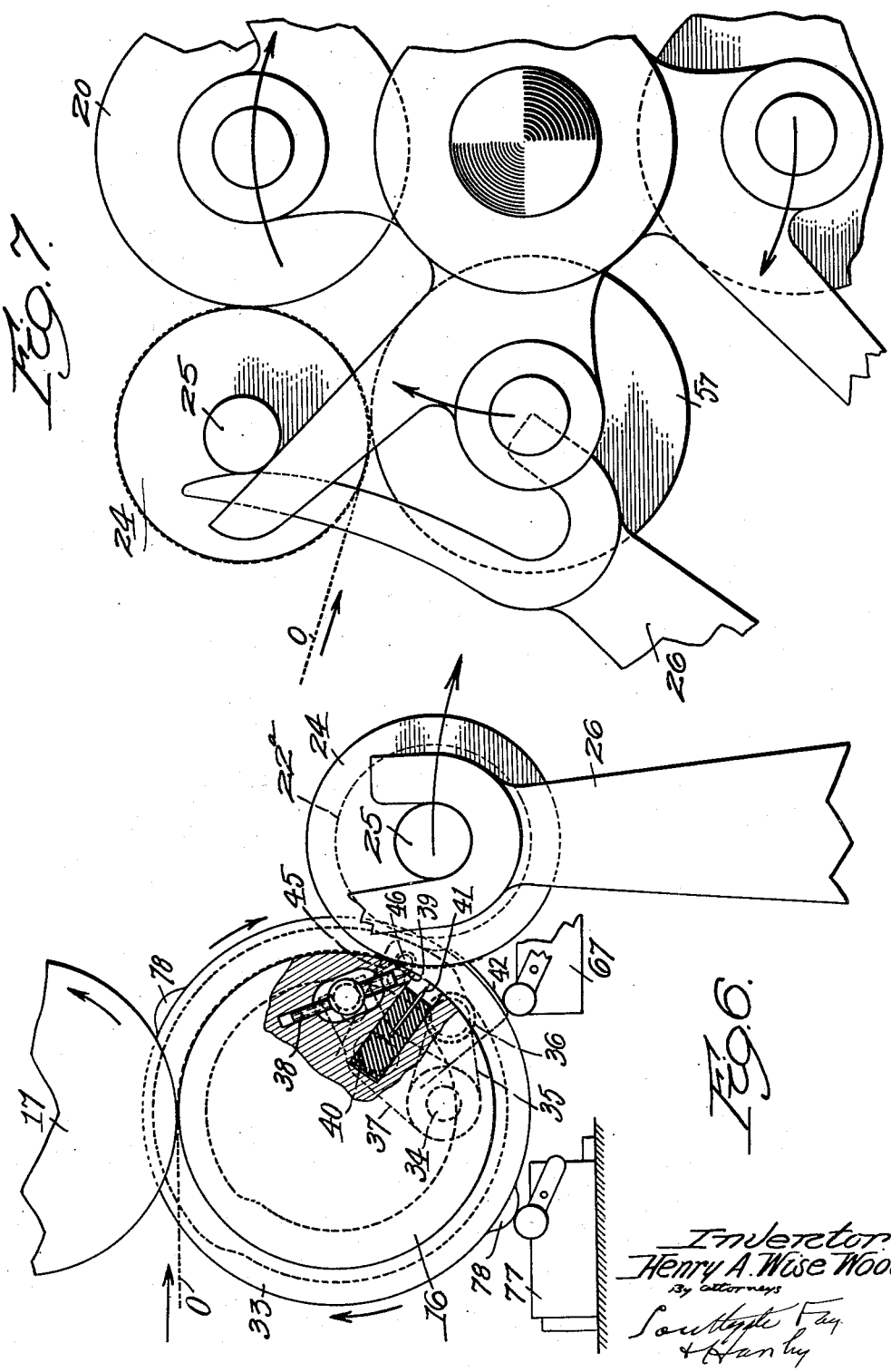

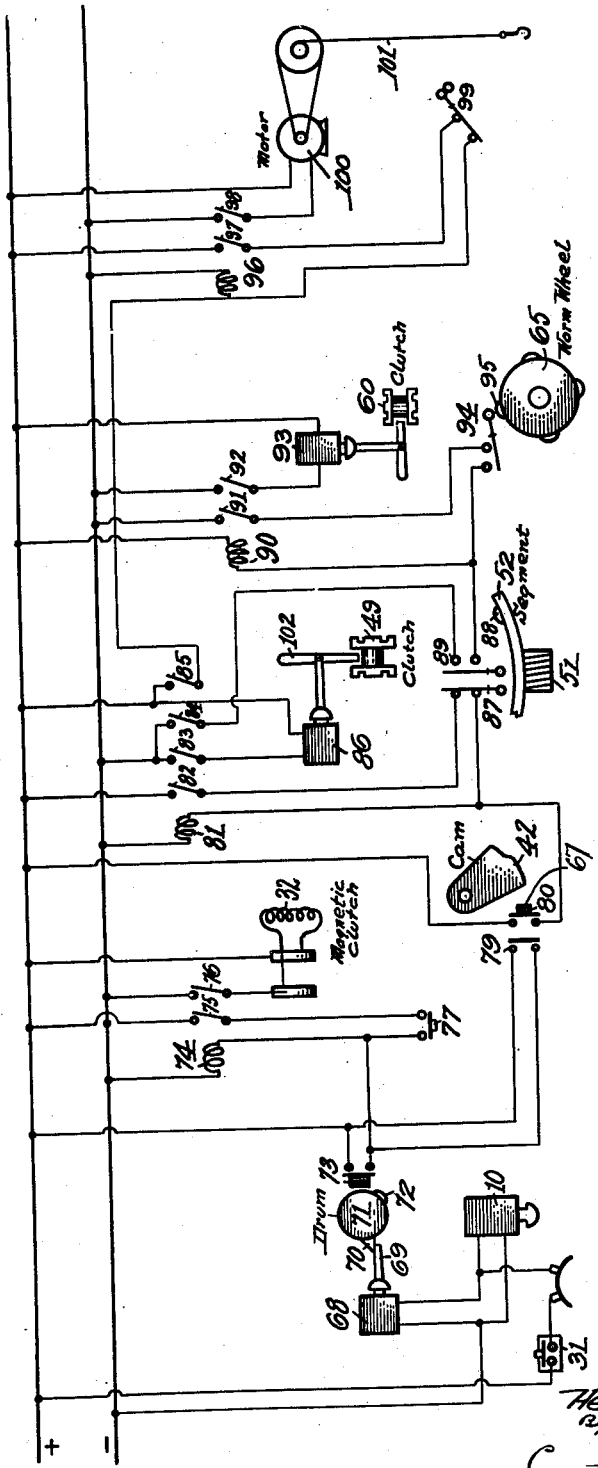

Patented May 14, 1940

2,200,905

UNITED STATES PATENT OFFICE 2,200,905

WEB SPLICING DEVICE

Henry A. Wise Wood, New York, N. Y., assignor to Wood Newspaper Machinery Corporation, New York, N. Y., a corporation of Virginia Application November 13, 1934, Serial No. 752,817
Renewed October 20, 1938

13 Claims. (Cl. 242—66)

The principal objects of this invention are to provide a web splicing device for splicing webs where rewinder mechanisms are used for such webs; to provide a splicing device for the offset web for a printing press which uses such a web; to provide a splicing device for the offset web, not only in combination with a splicing device for the printing web, but also in combination with a third splicing device for the rewinding mechanism; to provide a web splicing device adapted to be used to splice from a full-sized roll to a core; to provide for cutting off the web before the splice is made to the core; to provide such a splicing device in cooperation with the splicing means for the web that is to be printed upon; to provide for splicing the offset web in such a way that the rewinder splice can be made to come just subsequent to the passing of the regular splice to the rewinder mechanism so that this splice can be trimmed off when the roll is prepared for splicing again, and to provide such an arrangement applicable in any position where rolls are rewound after printing and stored until they are run into a cutting and folding mechanism.

Other objects and advantages will appear hereinafter.

Reference is to be had to the accompanying drawings, in which

Fig. 3 is an end view of the cutting couple for the rewinder splicing mechanism in its inoperative position;

Fig. 4 is a similar view of the cutting couple with the cam rotated to the operative position and the knife in the act of severing the web, the pins being shown attached to the forward end of the web;

Fig. 5 is an elevation of the magnetic clutch used in rotating the cutting cam;

Fig. 6 is an end view of part of the rewinding mechanism showing the web being transferred from the cutting cylinder to the newly pasted core;

Fig. 7 is a detail of the rewinder rolls just subsequent to splicing, and

Fig. 8 is a wiring diagram.

Figure 1:
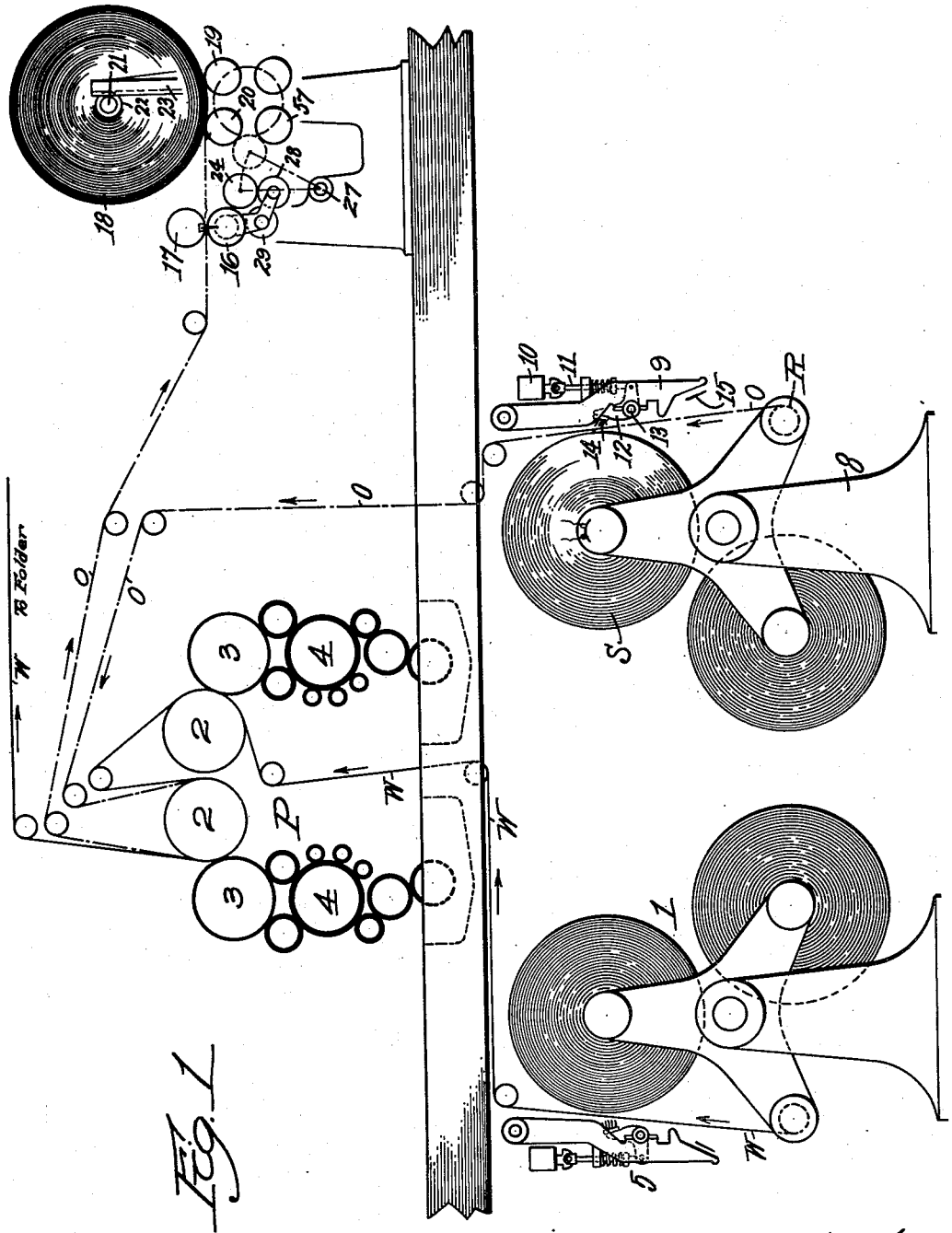
Fig. 1 is a partially diagrammatic end view of a printing press, constituting a preferred embodiment of this invention, said press being supplied from a regular web feed having a rotatable reel and also a reel for sending an offset web through the press to a rewinder mechanism.

As is well known, the automatic splicing of the web of a printing press has been developed to such a point that it is a commercial success. This invention involves the application of a device of this kind to a press where an offset web is used. Heretofore it was necessary to stop the press to splice the offset web.

In this invention a splicing device is used similar to the one for the printing web and a third splicing device for the rewinder mechanism of the offset web, all operating at web speed. The latter is used because it is impossible to continue running the offset web into the rewinder mechanism indefinitely. In the ordinary splicing of a printing web, the splicing is done from an exhausted web roll to a full fresh roll. In the case of splicing for a rewinder mechanism, it is necessary to splice from a full roll to a core and the web has to be cut off before the splice is made to the core. The splicing at the rewinder mechanism is tied up with the splicing of the offset roll so that the rewinder splice can be made to come just subsequent to the passing of the regular splice to the rewinder mechanism. In that way the latter splice can be trimmed off when the roll is prepared for splicing again. The rewinder, full speed, splicing device, as described herein, can be applied to a situation where rolls are rewound after printing and stored until they are run into a cutting and folding mechanism. The invention also can be used in paper mills where rewinder mechanisms are used but where no full speed splicing devices are as yet available.

The invention is shown as applied to a printing machine comprising an automatic supply mechanism 1 which continuously supplies a web W to a printing press P. After the printing, as usual, the web W is passed on to a folder, not shown. The printing press illustrated is of typical design although the invention is capable of application to other types of printing presses. This press carries two impression cylinders 2 cooperating with two plate cylinders 3 which latter are supplied with ink by ink motions 4 in the conventional or any other manner.

In this case an ordinary splicing device 5 is employed for splicing the web. The details of this splicing device are not described herein but, preferably, they are arranged substantially the same as another splicing device which will be described.

For splicing the offset web O, a rotatable reel 8 is employed which carries a spare roll S and a running roll R supplying the web O. The splicing device shown is of well known type comprising a brush arm 9, solenoid 10, link 11, and oscillatable brush bracket 12 mounted on a shaft 13. The bracket 12 is provided with brushes 14 for pressing the offset web O against the spare roll S to make a splice. A knife 15 is provided for severing the old web subsequent to the splice and works preferably as is well known in this art.

The offset web O progresses around suitable direction changing rollers and passes between the web W and the second impression cylinder 2 as is customary. The offset web O then passes over suitable direction changing rollers and between the cutting cylinder 16 and backing cylinder 17 to a take-up roll 18. The take-up roll 18 rests on rewinder rolls 19 and 20 which propel its surface at a speed equivalent to the surface speed of the impression cylinder 2. This mechanism thereby serves to take up the offset web O fed through a printing press and keep it taut. The take-up roll 18 has a spindle 21 carried in its core on the end of which core is mounted a collar 22 for cooperating with a groove in a standard 23. This prevents end motion of the take up roll 18 and thereby insures a smoothly wound roll.

The preferred method of operation is to start with a full roll in the reel 8 and a core on the spindle 21. With such a set up the take-up roll 18 would become a full roll when the running roll R is exhausted. When a splice is made from the offset roll R to a spare roll S it is then desirable to provide a new core in the rewinder mechanism so that the take-up roll 18 does not become excessively large. This is accomplished by furnishing a new core 24 mounted on a spindle 25, and carried in arms 26 securely mounted on a shaft 27, one at each end of the spindle 25. Previous to the placing of the core 24 in the arms 26, paste has been applied to its surface. With the placing of the core 24 in the arms 26 contact is made with propellers 28 which in turn contact with propellers 29 both of which are carried in arms 30 pivotally mounted around the center of the cutting cylinder 16 and yieldingly forced toward the core 24 by a spring 30ª. The propellers 29 contact with the cutting cylinder 16 beyond the paste thereon which is driven in any suitable manner (not shown) from the press. In this manner the core 24 is given a surface speed equivalent to that of the offset web O.

In the preferred manner of splicing, a push button 31 is provided to operate the solenoid 10 and splice the offset web O to the spare roll S. As this splice progresses through the printing press P, and just subsequent to its passage through the cutting couple 16—17, a magnetic clutch 32 is energized to move a cam 33 from the position shown in Fig. 3 to that shown in Fig. 4. The position of the arms 26 is that shown in Fig. 2. It will be noticed in Fig. 4 that a shaft 34, carried in the cutting cylinder 16, mounts arm 35 carrying a cam roll 36 which cooperates with the cam 33. Secured to the shaft 34 are arms 37 mounting a pin holder assembly 38 with pins 39. Also mounted in these arms is a knife box operating shaft 40. In Fig. 4 the cam roller 36 is operating in the larger diameter path of the cam 33 so that pins 39 and knife 41 are projected to their operating positions and cooperate with the backing cylinder 17. This means that the offset web O is severed by the knife 41 against a cutting rubber 66 and the new leading edge is picked up by the pins 39.

Oscillatably mounted about the center of the cutting cylinder 16 is a cam 42 which contacts with a collar 22ª mounted on a spindle 25 to prevent the core 24 from coming into contact with the cutting cylinder 16. A spring 43 yieldingly holds the cam 42 in the position shown in Fig. 4.

The arm 35 carries a projection 44 which mounts pin 45. After the paper pins 39 have picked up the forward edge of offset web O, the cutting cylinder 16 rotates around to the position shown in Fig. 6 where the cam roller 36 is brought nearer the center of the cutting cylinder 16, withdrawing the knife 41 and the paper pins 39 which release the sheet. Just previous to this, the pin 45 has come into contact with a spring pin 46 carried on the cam 42 and has rotated the cam 42 in a clockwise direction, permitting the core 24 to contact with the leading edge of the offset web O the moment it arrives at the contact point. Since the paper pins 39 have released this and paste has previously been applied to the core 24, the paper is then secured to and progresses around core 24. The magnetic clutch 32 is again made operative by the cam 42 operating the switch by which the cam 33 is rotated to the position shown in Fig. 3 so that the knife and pins become inoperative during their passage through the center line between the cylinders 16 and 17. The cam 33 remains in this inoperative position until another splice is to be made. This is called a splicing operation because the offset web is spliced to a new core. There is no splicing of one web to another at this point.

After the offset web O has been transferred to the core 24, it then becomes necessary to remove the take-up roll 18 and place the core 24 against the rewinder rolls. The take-up roll 18 may be removed by any suitable means such as hoisting cables 101 with two hooks placed on the spindle 21 to lift it clear of the rewinder mechanism. A clutch 49 may then be shifted to cooperate with a gear 47 which meshes with a press driven bevel gear 48. The clutch 49 is splined to a shaft 50 which is mounted in suitable bearings and has secured to it a worm 51 for meshing with a segment lever 52 which latter is rotatably mounted on the shaft 27. The upper end of the segment lever 52 carries projections 53 which serve to yieldingly connect the arm 26 with the segment lever 52 through springs 55 and a lug 56 of the arm 26. The engagement of the clutch 49 to the running gear 47 may be used to move the arm 26 from the full line position in Fig. 2 to the dotted line position. It will be observed that the core 24 then comes in contact with the rewinder rolls 20 and 57. The arms 30 are made to swing yieldingly about the center of roll 16 by the spring 30ª thereby keeping the propeller 28 in contact with the core 24 until such time as it contacts with the rewinder rolls 20 and 57.

A shaft 58 is press driven and mounts a bevel gear 59 which, through suitable gearing, imparts the proper rotation to the rewinder rolls. A clutch 60 may be used to connect a gear clutch 61 to rotate with shaft 58. The clutch gear 61 carries a gear which meshes with a bevel gear 62 which is secured to a shaft 63 along with a worm 64. The worm 64 meshes with a worm wheel 65 which is secured to the frame mounting the four rewinder rolls. It is clear that rotation of the worm wheel 65 may be used to rotate the rewinder rolls as shown in Fig. 7 so that the core 24 is moved around to take the relative position of the take-up roll 18. This completes the cycle of pasting, it being understood that, as will be explained, clutches 49 and 60 are engaged at the proper time to accomplish the desired result. The core 24 then acts as the take-up roll until such time as it becomes a full roll and the splicing operation is repeated.

Figure 2:
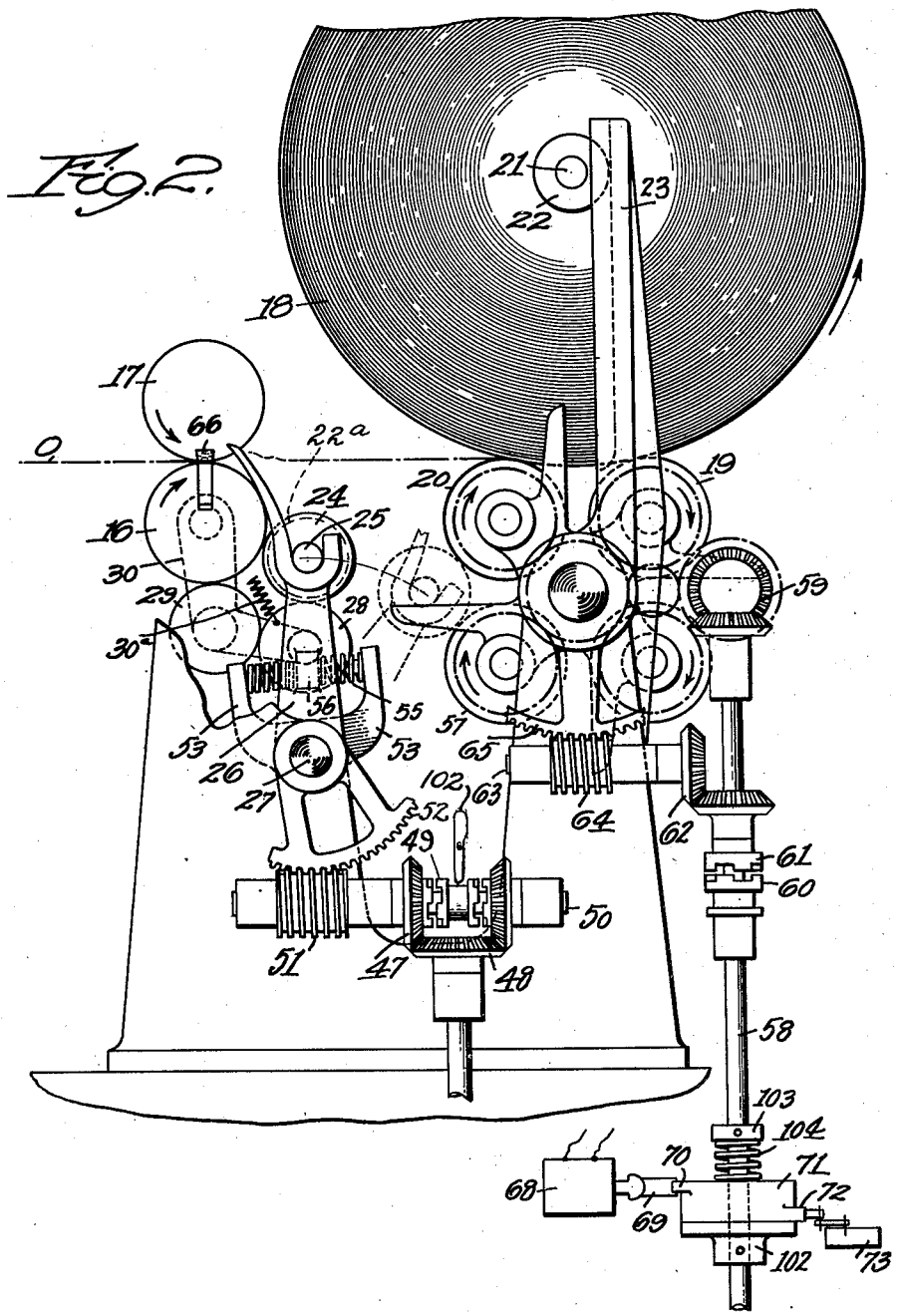
Fig. 2 is an enlarged end view of a rewinder mechanism with a splicing device applied thereto.

The delay mechanism which permits the splice from the spare roll S to pass through the cutting couple 16—17 before the rewinder splice is made is shown in Fig. 2 where a drum 71 is rotatably mounted on the shaft 58 and spring pressed by a spring 104 and collar 103 against a friction plate 102 secured to and rotating with the shaft 58. This tends to rotate the drum 71, but rotation is not permitted until a solenoid 68 is energized releasing the drum 71 to rotate proportionally to the speed of the press. After a definite amount of paper has passed through the press or until the splice has just passed through the cutting couple 16—17, contacts are closed in the switch 73. The deenergization of the solenoid 68 causes the lug 70 to be reengaged to hold the drum 71 against rotation.

Method of operation

Referring to the wiring diagram, Fig. 8, it will be seen how this invention operates. The solenoid 68 is connected in parallel with the solenoid 19 so that its energization at the moment of splicing releases the toe 69 from the lug 70 carried on the drum 71. The drum 71 is frictionally driven by the press and is therefore driven in proportion to its speed. After the proper amount of paper has been measured off from the point of splicing of the offset web O to the spare roll S until such time as the splice has passed through the cutting couple 16—17, a projection 72 on the drum 71 closes the contacts in the switch 73. By tracing the wires connecting these contacts it will be seen that a contactor 74 is energized closing two contacts 75 and 76, the latter of which causes power to be delivered to the magnetic clutch 32. This power energizes the clutch 32 when the cam 33 is in the position shown in Fig. 3. As the cam 33 begins to rotate in a clockwise direction, a switch 77 is closed which, through the contact 75, maintains a hold-in circuit for a contactor 74 and therefore for the clutch 32. When a projection 78 on the cam 33 opens the contacts in the switch 77, the projection 72 has already passed over the switch 73 opening these contacts. Consequently the contactor 74 is deenergized, opening contacts 75 and 76 and releasing the magnetic clutch 32. This stops the cam 33 in the position shown in Figs. 4 and 6. When the offset web O is properly transferred to the core 24, as shown in Fig. 6, the cam 42 has rotated to such a position that it operates the switch 67 to close the contacts 79 and 80. The contacts 79 are in parallel with the contacts in the switch 73 and, through the process described above, they reenergize the clutch 32 to cause the cam 33 to rotate to the position shown in Fig. 3 where the opening of the contacts in the switch 77 deenergizes the magnetic clutch 32, leaving the cam 33 in its inoperative position.

The closing of the contacts 80 causes a contactor 81 to be energized closing contacts 82, 83, 84 and 85. The closing of the contact 83 energizes a solenoid 86, causing the clutch 49 to be moved to the left as shown in Fig. 2 to engage the clutch gear 47. It will be seen that, with the press running, the arms 26, carrying the core 24 with the paper newly spliced to it, are moved from the full line to the dotted line position. This moves the core 24 from the cutting cylinder 16 against the rewinder rolls 20 and 57. The contact 82, through a limit switch 87, acts as a hold-in circuit for the contactor 81. As the segment 52 moves to the left, as shown in Fig. 2, a projection 88 closes the contacts 89 just before the limit of the motion of the segment 52. The closing of the contacts 89, through the already closed contact 84, energizes a contactor 90 which closes contacts 91 and 92. When the projection 88 opens the contacts 87, the contactor 81 is deenergized, causing the clutch 49 to be disengaged. This occurs, of course, when the arms 26 are in the dotted line position shown in Fig. 2.

The closing of the contact 92 causes a solenoid 93 to shift the clutch 60 into engagement with the gear clutch 61. This causes the rewinder roll frame to rotate as described above and as shown in Fig. 7. Two contacts 94, through the contact 91, serve as a hold-in circuit for the contactor 90 until such time as the rewinder frame has made ¼ revolution and the core 24 then assumes the position occupied by the take-up roll 18, at which time a projection 95 carried on the worm wheel 65 opens the contacts 94 and stops rotation of the rewinder roll frame by the disengagement of the clutch 60 and the clutch gear 61.

When the contactor 81 was energized, as described above, the contact 85 caused a contactor 96 to be energized, thus closing two contacts 97 and 98. The contact 97, through a limit switch 99, serves as a hold-in circuit for the contactor 96. The contact 98, when closed, causes a motor 100 to operate hoist cables 101 to lift the take-up roll 18 from the rewinder mechanism until such time as the limit switch 99 is open when the motor 100 ceases to operate.

A handle 102 is provided for manually shifting the clutch 49 to the right, as shown in Fig. 2, so that the arms 26 may be brought to the neutral position for the reloading of a newly pasted core for the next splicing operation.

It is apparent that with a device of this kind, automatic splicing is made possible on a rewinder mechanism and, while this is extremely useful in printing presses using offset webs, it also has its application where rolls are printed and rewound and is particularly applicable to paper mill machinery where rewinder mechanisms are used to take the supply from the paper mill.

Having thus described my invention and the advantages thereof, I do not wish to be limited to the details herein disclosed, otherwise than as set forth in the claims, but what I claim is:

1. The combination with means for feeding an offset web from a printing press, of a winder to which the web is fed for winding up the offset web, means for piercing the web, means for cutting the web between the piercing means and the winder, and means for connecting the leading end of the web from the printing press with a core and winding it thereon.

2. The combination with means for directing an offset web from a printing press, of a rewinder for winding up the web in a roll, a pair of cylinders between which the web is carried to the rewinder, means connected with said cylinders for cutting off the web, means for mounting a core in a position to receive the leading end of the web, means for rotating the core to wind the web thereon, and means for transferring the core to the rewinder in a position to turn the core and wind the web thereon.

3. The combination of a winding machine having means for rotating a core with a web attached thereto for winding the web on the core, a pair of cylinders between which the web is directed to the roll formed on the core, means on one of said cylinders for engaging the web, means on one of said cylinders for severing the web between the web-engaging means and the roll, means for starting to wind the web on the core, and means for transferring the core to the winding mechanism.

4. In a winding machine, the combination of a rotatable frame having a series of rolls arranged at equal distances from the axis of rotation thereof, whereby when any pair of said rolls is at the top they will support a roll of paper on a core, means for rotating all of said rolls so that the paper will be wound on the core, means for severing the web and passing the leading end of the following web to a new core, means for moving the new core into contact with two of the rolls, and means for rotating said frame carrying a series of rolls into a position in which the new core will rest on the top of the same against the surfaces of two of said rolls for the purpose of rotating it.

5. In a winding machine, the combination of a rotatable frame having a series of rolls arranged at equal distances from the axis of rotation thereof, whereby when any pair of said rolls is at the top they will support a roll of paper on a core, means for rotating all of said rolls so that the paper will be wound on the core, a pair of cylinders comprising a cutting and backing cylinder between which the web is directed to the roll on the winding machine, means for severing the web at said cylinders and passing the leading end of the following web part way around one of them and applying it to a new core at the side of said frame, means for moving the new core into contact with two of the rolls at the side of said frame, and means for rotating said frame carrying the series of rolls into a position in which the new core will rest on the top of the same against the surfaces of two of said rolls for the purpose of rotating it.

6. In a winding machine, the combination of a rotatable frame, a plurality of rolls carried by said frame, means for rotating all said rolls on their axes simultaneously, means for rotating said frame, means for disconnecting the last-named rotating means from its source of power, an oscillating device for loading cores to be wound on said winding machine in a position at the side thereof where such cores will engage certain of said rolls and be rotated thereby, whereby, when the frame is rotated to a position in which the rolls engaging the core come at the top, they will support the core and rotate it, and automatic means for stopping and starting the oscillating device.

7. In a winding machine, the combination of a rotatable frame, a plurality of rolls carried by said frame at equal distances from the axis thereof, means for rotating all said rolls on their axes simultaneously independently of the position of the frame, automatically operated means for rotating said frame, means for disconnecting the last-named rotating means from its source of power, an oscillating device for loading a core to be wound on said winding machine in a position at the side thereof where such core will engage certain of said rolls and be rotated thereby, said loading device comprising a projection on the frame for receiving the core and holding it until the frame is rotated to a position in which the rolls thereon will support and rotate the core, and automatic means for stopping and starting the oscillating device.

8. In a winding machine, the combination of a rotatable frame, a plurality of rolls carried by the frame at equal distances from its axis of rotation, means for rotating all of said rolls on their respective axes, and means for rotating said frame to bring any two adjacent rolls to the top to support a core and rotate it.

9. In a winding machine, the combination of a rotatable frame, a plurality of rolls carried by the frame at equal distances from its axis of rotation, a projection carried by said frame adjacent each roll for supporting a core moved toward the frame, means for rotating all of said rolls on their respective axes, and means for rotating said frame to bring any two adjacent rolls to the top to support a core and rotate it.

10. In a printing machine having printing couples, the combination with means for feeding an offset web thereto, of a rotatable reel attached to carry a plurality of web rolls serving the unwinding end of the offset web, a rewinder on the delivery end of the press, means for automatically splicing the web to a new core on the rewinding end, and means for interconnecting in timed relation the feeding device on the unwinding end of the offset web with the splicing device on the rewinding end.

11. In a printing machine having printing couples adapted to carry an offset web, the combination of a reel to carry a web roll serving the unwinding end of the offset web, a web splicing device therefor, a rewinder on the delivery end of the press, means for automatically splicing the web to a new core on the rewinding end, and means for interconnecting in timed relation the splicing device on the unwinding end with the splicing device on the rewinding end.

12. In a printing machine having printing couples adapted to employ an offset web and a web to be printed, the combination with means for supplying the offset web, and means for splicing the offset web to a fresh web roll, of a rewinder located in position for rewinding the offset web at the delivery end of the printing couple, means cooperating with the rewinder for splicing the leading end of the offset web to a new core while the offset web is running and after it passes through the printing couple, and means for synchronizing the splicing of the leading end of the web with the first-named splicing means.

13. In a printing machine having printing couples adapted to employ an offset web, the combination with means for supplying the offset web, and means for splicing the offset web to a fresh web roll, of a rewinder located in position for rewinding the offset web at the delivery end of the printing couple, means cooperating with the rewinder for splicing the leading end of the offset web to a new core, a timing drum, means for rotating the timing drum proportionately to the speed of the press, means for initiating the rotation of said drum, means whereby the rotation of said drum measures the web from the time a splice is made on the unwinding end of the offset web until it reaches the rewinding end and is spliced to a new core.

HENRY A. WISE WOOD.